United States Patent
Hilmi et al.

(10) Patent No.: US 8,163,437 B2
(45) Date of Patent: Apr. 24, 2012

(54) ANODE WITH CERAMIC ADDITIVES FOR MOLTEN CARBONATE FUEL CELL

(75) Inventors: Abdelkader Hilmi, Bethel, CT (US); Chao-Yi Yuh, New Milford, CT (US); Mohammad Farooque, Danbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 1039 days.

(21) Appl. No.: 12/054,997

(22) Filed: Mar. 25, 2008

(65) Prior Publication Data
US 2009/0246562 A1 Oct. 1, 2009

(51) Int. Cl.
*H01M 8/10* (2006.01)
*H01M 4/36* (2006.01)
*H01M 4/38* (2006.01)
*H01M 8/00* (2006.01)
*H01M 8/22* (2006.01)
*B05D 5/12* (2006.01)
*H01M 4/88* (2006.01)
*H01M 8/14* (2006.01)
*H01M 8/06* (2006.01)

(52) U.S. Cl. ........ 429/486; 429/109; 429/405; 429/421; 429/478; 429/485; 429/527; 429/535; 427/115; 502/101; 264/299; 156/242

(58) Field of Classification Search .................. None
See application file for complete search history.

(56) References Cited

U.S. PATENT DOCUMENTS

| | | | |
|---|---|---|---|
| 4,297,419 A | 10/1981 | Nickols, Jr. et al. | |
| 4,342,792 A | 8/1982 | Brown et al. | |
| 4,702,971 A | 10/1987 | Isenberg | |
| 4,812,329 A | 3/1989 | Isenberg | |
| 4,943,496 A * | 7/1990 | Okada et al. | 429/454 |
| 5,229,221 A * | 7/1993 | Donado et al. | 429/535 |
| 5,354,627 A | 10/1994 | Hatoh et al. | |
| 5,478,663 A * | 12/1995 | Cipollini et al. | 429/460 |
| 5,869,203 A * | 2/1999 | Huang et al. | 429/475 |
| 5,908,713 A | 6/1999 | Ruka et al. | |
| 6,296,972 B1 | 10/2001 | Hong et al. | |
| 6,358,567 B2 | 3/2002 | Pham et al. | |

(Continued)

FOREIGN PATENT DOCUMENTS
WO  WO 03/035255  5/2003

OTHER PUBLICATIONS

The above references were cited in a Supplementary European Search Report issued on Aug. 1, 2011, that issued in the corresponding European Patent Application No. 09725158.

*Primary Examiner* — In Suk Bullock
*Assistant Examiner* — Jennifer Wecker
(74) *Attorney, Agent, or Firm* — Cowan, Liebowitz & Latman, P.C.

(57) ABSTRACT

A molten carbonate fuel cell anode comprising a porous anode body, which comprises a nickel-based alloy and at least one ceramic additive dispersed throughout the anode body. The amount of the ceramic additive in the anode body is between 5 and 50% by volume. The nickel-based alloy is Ni—Cr or Ni—Al, and the ceramic additive is one of $CeO_2$, yttrium doped ceria, yttrium doped zirconia, $TiO_2$, $Li_2TiO_3$, $LiAlO_2$ and $La_{0.8}Sr_{0.2}CoO_3$.

28 Claims, 5 Drawing Sheets

U.S. PATENT DOCUMENTS

| | | |
|---|---|---|
| 6,458,170 B1 | 10/2002 | Visco et al. |
| 6,585,931 B1 | 7/2003 | Kweon et al. |
| 6,824,913 B2 | 11/2004 | Hong et al. |
| 2002/0127455 A1 | 9/2002 | Pham et al. |
| 2003/0082436 A1 | 5/2003 | Hong et al. |
| 2003/0096155 A1* | 5/2003 | Hong et al. .................... 429/41 |
| 2003/0118466 A1* | 6/2003 | Yuh et al. ......................... 419/2 |
| 2003/0170539 A1* | 9/2003 | Schoonmaker et al. ...... 429/217 |
| 2005/0089739 A1* | 4/2005 | Seccombe et al. ............. 429/30 |
| 2005/0153186 A1 | 7/2005 | Hilmi et al. |

* cited by examiner

ANODE WITH CERAMIC ADDITIVES FOR MOLTEN CARBONATE FUEL CELL

BACKGROUND OF THE INVENTION

1. Field of the Invention

This invention relates to fuel cells having a nickel-based anode and cathode and a molten carbonate electrolyte within a porous ceramic matrix and, in particular, to an anode for use in a fuel cell having a structure that enhances electrolyte retention. More particularly, the invention comprises an anode for use in a molten carbonate fuel cell that is formed with ceramic additives using a method that is easy and inexpensive to perform and repeat. The resulting anode structure has a high capacity for electrolyte, which limits electrolyte loss, which in turn improves fuel cell stability and enhances the lifetime of the cells, and which also reduces cathode flooding as well as cathode polarization.

2. Description of the Related Art

A fuel cell is a device that directly converts chemical energy in the form of a fuel into electrical energy by way of an electrochemical reaction. In general, like a battery, a fuel cell includes a negative electrode or anode and a positive electrode or cathode separated by an electrolyte that serves to conduct electrically charged ions between them. In contrast to a battery, however, a fuel cell will continue to produce electric power as long as fuel and oxidant are supplied to the anode and cathode, respectively. In order to produce a useful amount of power, individual fuel cells are typically arranged in stacked relationship in series with an electrically conductive separator plate between each cell.

Fuel cells having molten carbonate electrolyte are of particular interest for power generation due to their high efficiency and clean conversion of chemical energy into electrical energy. Carbonate fuel cells operate at intermediate temperatures, or approximately 575-700° C., and use carbonaceous fuel containing carbon dioxide and carbon monoxide. A common fuel cell assembly includes a porous nickel (Ni) anode which has been stabilized against sintering by chromium or aluminum additives, or both, and a porous in-situ oxidized and lithiated nickel oxide (NiO) cathode, separated by molten alkali carbonate electrolyte (either $Li_2CO_3/K_2CO_3$ or $Li_2CO_3/Na_2CO_3$) contained within a porous ceramic matrix (such as $LiAlO_2$).

A common problem and significant consideration in the long-term operation of a carbonate fuel cell is the loss of electrolyte due to electrolyte creep, evaporation and corrosion of fuel cell components. Electrolyte loss causes high internal resistance and ultimately shortens the lifetime of the fuel cell. Various attempts have been made to mitigate this problem.

One method consists of incorporating excess electrolyte in the fuel cell. Such an excess, however, will cause cathode flooding because of the low contact angle of the NiO cathode, which has good wettability. Cathode flooding in turn leads to significantly increased cathode polarization and consequently reduces overall cell performance. To prevent flooding of the cathode, the anode could be formed with smaller pores which by capillary pressure would increase the amount of electrolyte in the anode. On the other hand, smaller pores in the anode may lead to diffusion resistance of the reactant gas, which polarizes the electrodes and decreases the cell performance.

It may therefore be preferable, instead of forming an anode with smaller pores, to improve the wettability of the anode. In response to the need for a molten carbonate fuel cell anode with high porosity and improved wettability, a ceramic film coating has been used on the surface of the anode to improve its wettability. For example, Hong et al. (U.S. Pat. No. 6,824,913) disclose an anode structure developed to improve wettability of the anode to the molten carbonate electrolyte without changing the anode or electrolyte material itself, and is directed to the problem of electrolyte loss in the anode of a molten carbonate fuel cell. In particular, Hong et al. teach an anode coated with a porous ceramic film, which avoids recognized problems with small pores in the anode. The anode is coated with a porous thin film of ceramic materials such as $CeO_2$ and $Al_2O_3$ to improve the anode wettability and reduce electrolyte loss.

However, as can be seen in FIG. 2 of Hong et al., preparing the coated anode is a complex technique requiring many steps such as sintering green tape at 1000° C., repeatedly coating and drying, and sintering again until the desired structure is formed. The different processing steps in the technique of Hong et al. are expensive and enhance the risk of brittleness, mainly in the production of large anodes. In addition, the non-conductive coating used in Hong et al. may significantly increase contact resistance.

Therefore, there is a need for an anode having improved wettability and performance characteristics which can be prepared using a simple and a cost-effective technique. In addition, there is a need for a method of forming such an improved anode electrode which reduces the risk is of brittleness of the electrode and which does not negatively affect the electrodes contact surfaces.

It is therefore an object of the invention to provide an improved anode with improved wettability and electrolyte retention characteristics.

It is a further object of the invention to provide a method of preparing the improved anode that is not complex and does not require multiple different processing steps.

It is also an object of the invention to provide a method of preparing the improved anode that is cost-effective and that does not negatively affect the strength and porosity of the anode.

SUMMARY OF THE INVENTION

The above and other objectives are realized in a molten carbonate fuel cell anode comprising a porous anode body which comprises a nickel-based alloy and at least one ceramic additive dispersed throughout the anode body, wherein the amount of the at least one ceramic additive in the anode body is between 5 and 50% by volume. In certain embodiments, the anode body is formed from a slurry that comprises at least the nickel-based alloy and the at least one ceramic additive, wherein the amount of the at least one ceramic additive in the slurry is between 5 and 50% by volume. In certain embodiments, the amount of the at least one ceramic additive in the anode body is not more than 30% by volume.

The nickel-based alloy is one of Ni—Cr alloy having 1-30% of Cr by weight and Ni—Al alloy having 1-30% of Al by weight, while the ceramic additive is a material that exhibits good stability during fuel cell operation. For example, the ceramic additive can be one of $CeO_2$, yttrium doped ceria, yttrium doped zirconia, $TiO_2$, $Li_2TiO_3$, $LiAlO_2$ and $La_{0.8}Sr_{0.2}CoO_3$ (LSC). In certain embodiments, the anode body is formed from nickel-based alloy powder having a mean particle size between 10 and 60 microns and preferably a mean particle size of about 20 microns and ceramic additive powder having a mean particle size less than 5 microns.

A method of making the molten carbonate fuel cell anode and a molten carbonate fuel cell comprising the molten carbonate fuel cell anode are also described.

BRIEF DESCRIPTION OF THE DRAWINGS

The above and other features and aspects of the present invention will become more apparent upon reading the following detailed description of an illustrative embodiment thereof, in conjunction with the accompanying drawings, in which.

DETAILED DESCRIPTION

Figure 1:
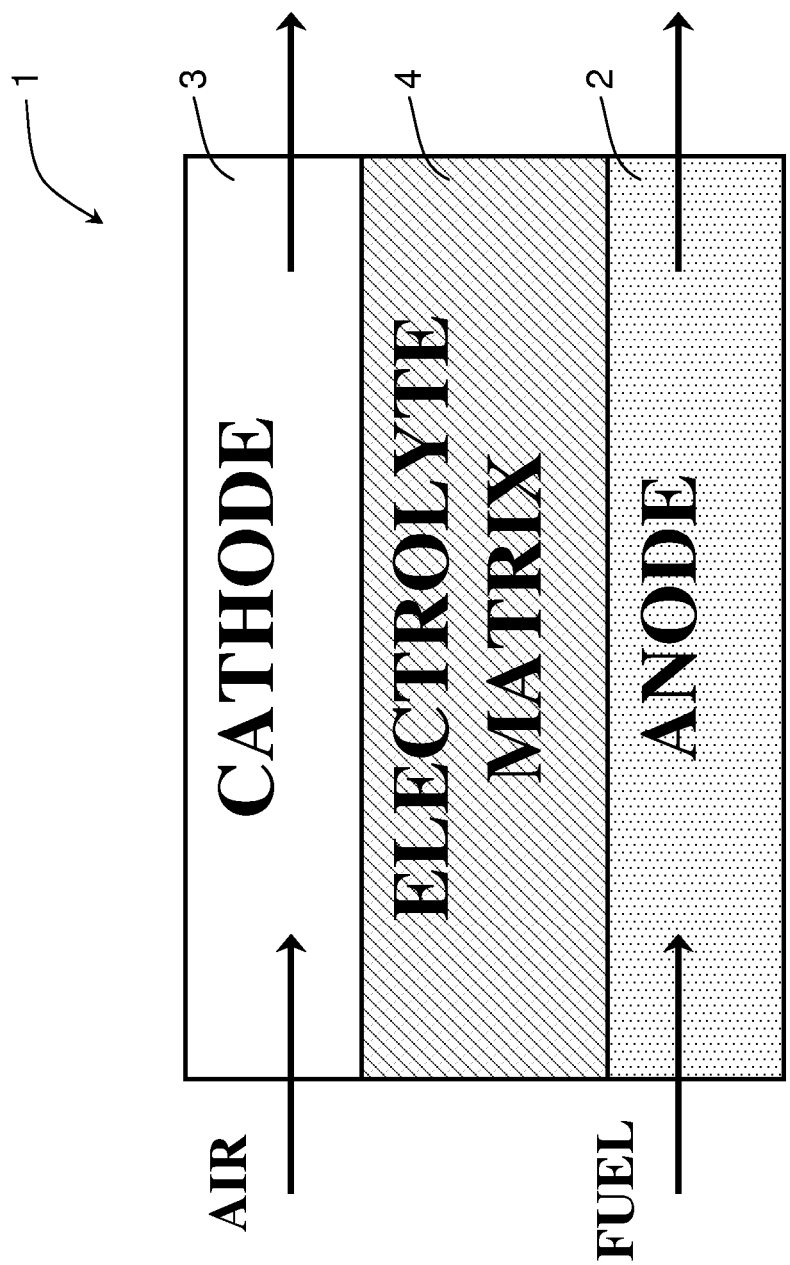
FIG. 1 schematically illustrates a molten carbonate fuel cell including an improved molten carbonate fuel cell anode.

FIG. 1 schematically shows a molten carbonate fuel cell 1 which includes an improved anode electrode having improved wettability and high capacity for electrolyte retention. As shown, the fuel cell 1 comprises an anode 2 and a cathode 3. Between the cathode and the anode is an electrolyte matrix 4 which includes alkali carbonate electrolyte. The cathode 3 is formed from nickel or nickel oxide (NiO) materials commonly used in molten carbonate fuel cell cathodes. The anode 2 comprises a porous anode body formed from an alloy material, such as Ni—Al alloy or Ni—Cr alloy, and one or more ceramic additive materials, with the ceramic additive material being substantially uniformly distributed or mixed throughout the anode body. The amount of the ceramic additive materials in the anode body is between 5 and 50% by volume. However, in certain embodiments, the amount of the ceramic additive materials in the anode body is not more than 30% by volume.

In the illustrative embodiment, the alloy material used in the anode body is Ni—Al alloy having about 1-30 wt % of Al or Ni—Cr alloy having about 1-30 wt % of Cr. In certain embodiments, the alloy Ni—Al or Ni—Cr material includes about 3-5% of Al or Cr, respectively. The ceramic additive material in the anode is selected from conductive and non-conductive materials which are very stable in the carbonate electrolyte and which have good wettability in molten carbonate electrolyte. Such ceramic additive materials include one or more of $CeO_2$, yttrium doped ceria (YDC), yttrium doped zirconia (YSZ), $TiO_2$, $Li_2TiO_3$, $LiAlO_2$ and $La_{0.8}Sr_{0.2}CoO_3$ (LSC). The mean particle size of the ceramic additives in the anode is selected so as to obtain a desired sub-micron pore structure in the anode, while the amount of the ceramic material present in the anode is such that anode flooding by molten electrolyte is prevented during operation of the fuel cell.

The use of ceramic additive materials in the anode throughout the anode body results in formation of sub-micron size pores so that the anode is able to retain more electrolyte in its pores and the anode's wettability is improved. The sub-micron pores and larger pores in the anode body are randomly and substantially uniformly dispersed throughout the body so that there is a balance between the larger and sub-micron pores in the anode body and the anode body has a substantially uniform mean porosity throughout the body. The desired size of the sub-micron pores formed in the anode is less than 0.5 μm, and thus it is desired that the mean particle size of the ceramic additives in the anode be less than 5 μm. Also, as mentioned above and discussed herein below, the amount of the ceramic material used in the anode during the formation of the anode is between 5 and 50 vol % so as to avoid anode flooding and any negative effects to the anode's conductivity. As also mentioned above, in certain embodiments, particularly where the ceramic additive materials have a lower conductivity, the amount of the ceramic material used in the anode during formation of the anode is no more than 30 vol % so as to further avoid any negative effects to the anode's conductivity.

Figure 2:
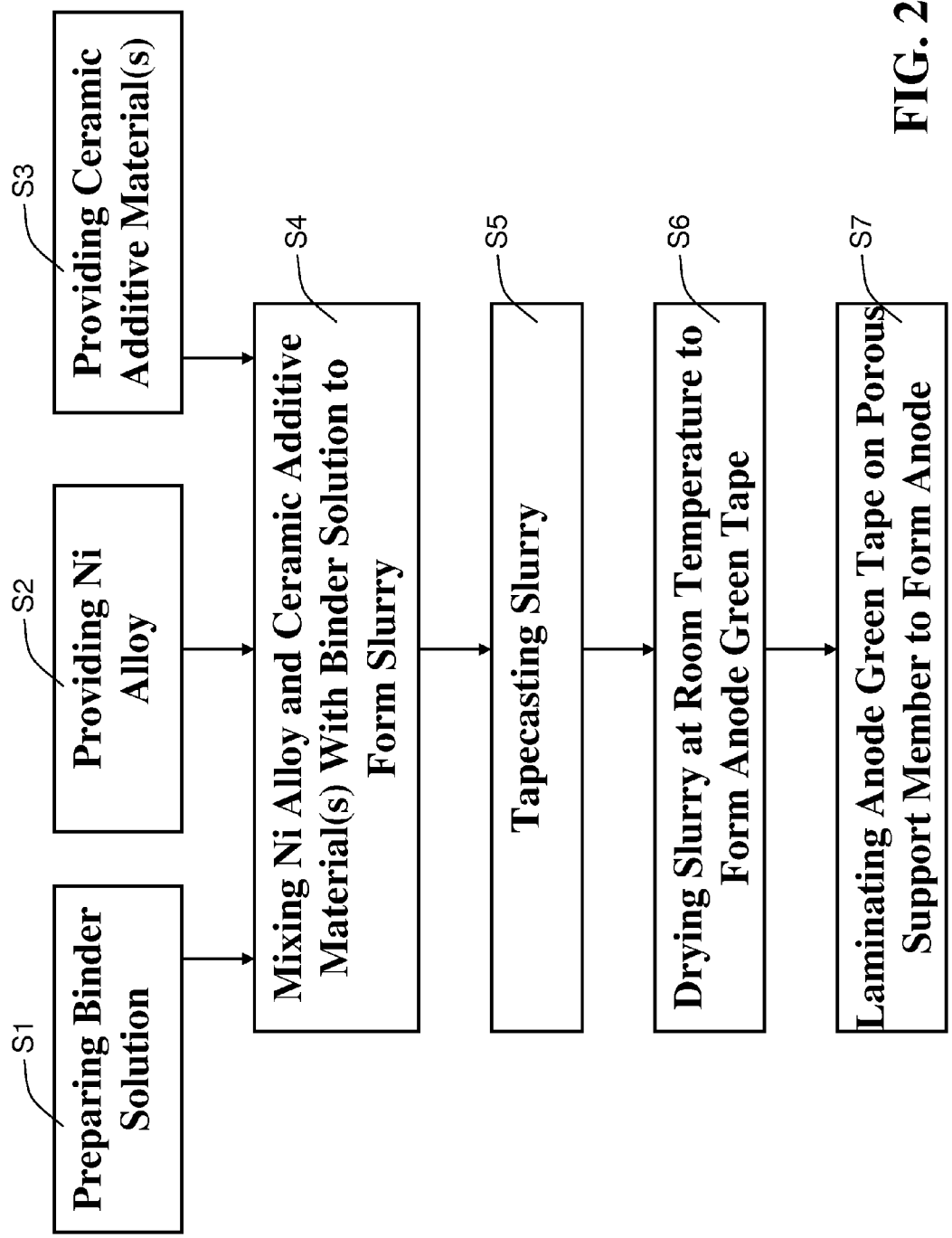
FIG. 2 schematically illustrates steps of a method for preparing the anode of FIG. 1.

The improved anode 2 of FIG. 1 is prepared using a method illustrated in FIG. 2. As shown in FIG. 2, a binder solution is prepared in a first step S1. The binder solution includes a binder, such as an acryloid binder, a dispersant and a solvent. In addition, a plasticizer, such as a santicizer plasticizer, may be used in the binder solution. In this illustrative embodiment, the dispersant used in the binder solution is fish oil while the solvent is reagent alcohol. In step S1, pre-selected amounts of the binder, dispersant and plasticizer are dissolved in the solvent and are thereafter mixed using a ball milling process or any other suitable mixing technique. In this illustrative embodiment, the ball milling process is carried out overnight.

In the step S2, a pre-selected amount of Ni alloy, such as Ni—Al or Ni—Cr, is provided and in step S3, a pre-selected amount of one or more ceramic additive materials is provided. As mentioned herein above, the Ni alloy provided in step S2 is Ni—Al or Ni—Cr, having 1-30 wt % of Al or Cr, and the ceramic additive material provided in step S3 is one or more of $CeO_2$, yttrium doped ceria (YDC), yttrium doped zirconia (YDZ), $TiO_2$, $Li_2TiO_3$, $LiAlO_2$ and $La_{0.8}Sr_{0.2}CoO_3$ (LSC). The Ni alloy provided in S2 and the ceramic additive material provided in S3 are both in powder form. The mean particle size of the Ni alloy provided in S2 is between 10 and 60 microns, and preferably about 20 μm, while the mean particle size of the ceramic additive material provided in S3 is less than 5 μm so as to achieve the desired sub-micron structure of the anode. In addition, the amount of ceramic additive material is selected such that when an anode slurry is prepared by combining the Ni alloy, the one or more ceramic additive materials and the binder solution, the amount of ceramic additive material in the anode slurry is 5 to 50 vol %, or 5 to 45 wt %. As mentioned herein above, in certain embodiments the amount of the one or more ceramic additive material in the anode slurry is not more than 30 vol %.

In step S4, the Ni alloy powder from step S2, the ceramic additive material powder from step S3 and the binder solution from step S1 are combined and mixed or milled so as to form the anode slurry. In certain illustrative embodiments, the mixture of the Ni alloy, ceramic additive material and binder solution is mixed for about 1 hour. In another illustrative embodiment, this mixture is instead ball milled for 5 to 10 hours until the anode slurry having a uniform consistency and with a viscosity of about 10,000-12,000 cps is formed.

The anode slurry formed in step S4 is then tapecast in step S5 at a desired thickness and dried at room temperature in step S6 so as to form anode green tapes. The thickness of the anode green tapes may vary depending on the construction and requirements of the fuel cell system. In the present illustrative embodiment, the anode slurry is tape cast in step S5 at a thickness of 3-15 mils, and preferably at a thickness of about 12-13 mils so that the thickness of the anode green tapes after drying in step S6 is about 6-7 mils. The anode green tapes formed in steps S5 and S6 are thereafter laminated on a porous support member, such as a Ni screen, in step S7 to form the anode electrodes for use in the fuel cell.

The anode electrodes formed using the method shown in FIG. 2 have improved wettability characteristics, without negatively affecting their conductivity. As can be appreciated, the method of FIG. 2 is simple to perform and does not include many complex or heating steps. For example, the method of FIG. 2 does not include any sintering steps to form the required anode structure. Finally, the method of FIG. 2 is cost-effective and easily reproducible. An illustrative example of the preparation of an improved anode from Ni—Al and LSC is described herein below.

EXAMPLE

In this example, the anode electrodes are prepared from Ni—Al alloy and LSC using the method of FIG. 2. In the first step S1, a mixture of about 37 wt % of acryloid binder and about 6 wt % of dispersant dissolved in about 57 wt % of reagent alcohol solvent. This mixture is then ball milled overnight so as to produce the binder solution. In step S2, Ni-3Al powder having about 3 wt % of Al and a mean particle size of 20 μm is provided and in step S3, LSC ceramic additive material having a mean particle size of 4 μm or less is provided. The amount of LSC provided is such that the anode slurry formed by combining the binder solution, Ni-3Al powder and LSC includes about 12.9 wt % of LSC.

In step S4, the Ni-3Al powder and LSC from steps S2 and S3, respectively, are added to the binder solution and are mixed for 1 hour or ball milled for 5-10 hours. In this way, the anode slurry is formed in which the amount of LSC is 12.9 wt %. The anode slurry is then tape cast at a thickness of 12-13 mils in step S5 and dried at room temperature in step S6 so as to form anode green tapes having a thickness of about 6-7 mils after drying. The anode green tapes formed in step S6 are then laminated on a porous support member, such as a Ni screen, in step S7 to form anode electrodes.

The anode electrodes formed in this example were examined to determine their porosity or pore size distribution, and to compare the porosimetry data of the anodes formed in this example with the conventional Ni-3Al anodes. The conventional Ni-3Al anodes were formed using a similar technique involving formation of an anode slurry and tapecasting the slurry, but did not include any ceramic additive materials.

Figure 3:
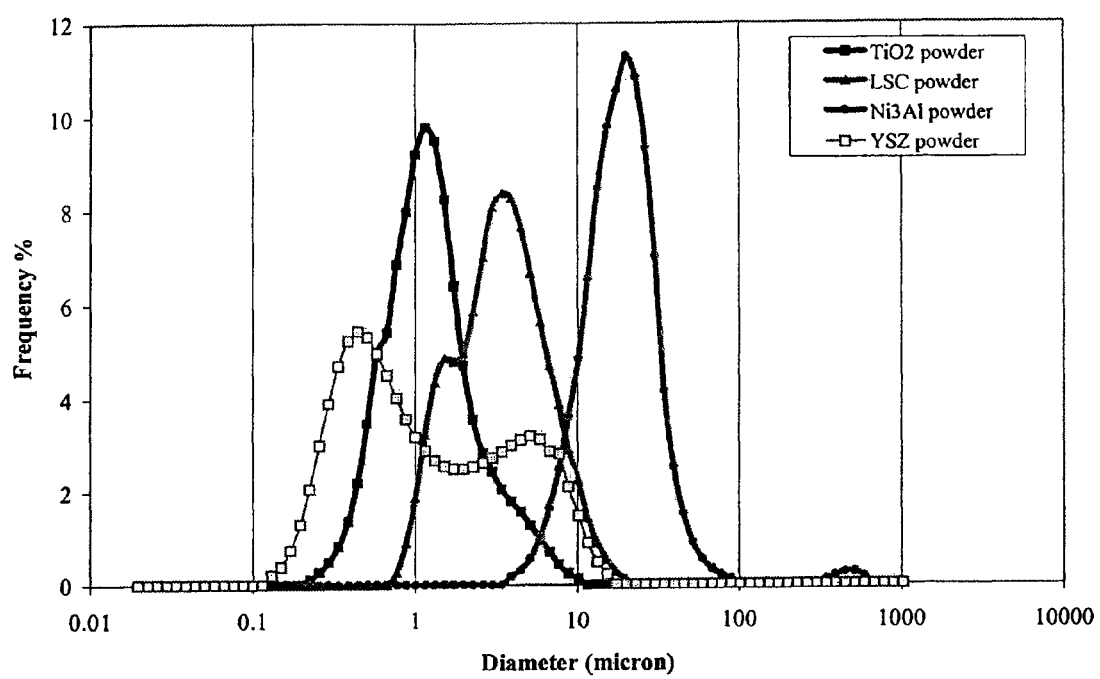
FIG. 3 shows a particle size distribution graph of components used for preparing the anode of FIG. 1.

FIG. 3 shows a particle size distribution graph of components used for preparing the anode in this example. FIG. 3 also includes particle size distributions of $TiO_2$ and YSZ ceramic additive materials which may be used instead of, or in addition to, the LSC ceramic additive material used in the example. The X-axis in FIG. 3 represent particle diameter in microns, while Y-axis in FIG. 3 represent the particle frequency in percent (%). As shown, the particle size of Ni-3Al powder used in the anode is between 6 and 100 microns, with the largest number of particles having a diameter between 20 and 30 microns. The particle size of the LSC ceramic additive powder used in the anode is between 0.8 and 20 microns, with the largest number of particles having a diameter between 3 and 7 microns.

If YSZ is used in the anode as the ceramic additive material, the particle size of YSZ powder ranges between 0.2 and 15 microns, with the largest number of particles having a diameter of 0.4-7 microns. As can also be seen from FIG. 3, if $TiO_2$ powder is used in the anode as the ceramic additive material, the particle size of $TiO_2$ ranges between 0.3 and 9 microns in diameter, with the largest number of particles having a diameter of 0.8-3 microns.

Figure 4:
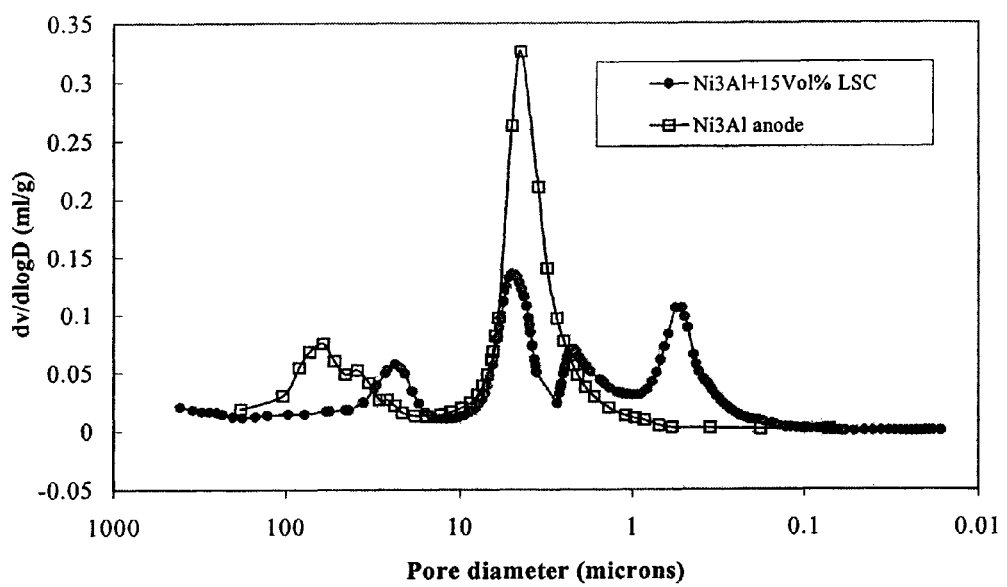
FIG. 4 shows a pore size distribution graph for conventional anodes and an improved anode of FIG. 1.

As mentioned herein above, the particle sizes of the components of the anode determine the porosity and the pore size distribution of the anode. FIG. 4 shows a pore size distribution graph showing pore size distributions of the anode prepared in the above-described example, i.e. the anode formed from Ni-3Al and 15 vol % LSC additive material, and of the conventional Ni-3Al anode. In FIG. 4, the X-axis represent the pore diameter in microns of the pores in the anode, while the Y-axis represent the frequency of the pores in the anode, shown as pore volume dv/dlogD in ml/g.

As shown in FIG. 4, the conventional Ni-3Al anodes include a large number of small pores having a pore diameter between 3 and 8 microns and also a relatively large number of pores having a large diameter between 30 and 80 microns. In contrast, the anodes prepared in the above example from Ni-3Al and 15 vol % LSC have an improved pore structure with an increased number of small pores throughout the anode body. As can be seen in FIG. 4, such anodes include some larger pores throughout the anode body having a pore diameter between 20 and 40 microns, and also have a large number of small pores throughout the anode body having a pore diameter between 6 and 8 microns and with a pore diameter smaller than 5 microns. In addition, pores having a diameter smaller than 0.5 microns amount to more than 6% of the total pore volume in these anodes.

The pore structure of the anodes formed from Ni-3Al and 15 vol % LSC, and in particular the greater number of smaller pores in such anodes, results from the addition of fine LSC particles as the additive material in the anode. The increased number of small pores in the anodes formed in accordance with the above example results in an improved electrolyte retention by the anode and an increase in the active surface area of the anode. These improved characteristics of the anode result in an improvement of fuel cell performance and its operating life.

Anodes prepared in accordance with the above-described example with other ceramic additive materials such as $TiO_2$, $Li_2TiO_3$, YDC, $CeO_2$, $LiAlO_2$ and YSZ have a similar anode pore structure and like improved characteristics as the anodes prepared with LSC as the additive material. It is desirable that the ceramic additive materials used in the anode prepared in accordance with the above example are selected from ceramic materials that exhibit similar or higher stability than $LiAlO_2$ (i.e., similar or lower solubility in electrolyte than $LiAlO_2$ during fuel cell operation).

The anodes prepared from Ni-3Al and ceramic additives using the method described above were tested to determine their effect on anode polarization and on the performance of the fuel cells. These anodes were tested in button cells having an electrode area of 3 cm$^2$ equipped with two reference electrodes. Each button cell tested included the anode electrode being tested, a lithiated NiO cathode, a $LiAlO_2$ matrix filled with $62Li_2CO_3/38K_2CO_3$ electrolyte and current collectors, assembled and housed by a high purity alumina housing. Fuel gas comprising 72.8% $H_2$-18.2% $CO_2$-9% $H_2O$ was passed through the anode electrode and oxidant gas comprising 18.5% $CO_2$-12.1% $O_2$-66.4% $N_2$-3% $H_2O$ was passed through the cathode electrode. The tests were performed at a current density of 160 mA/cm$^2$ and at a low utilization of about 5% for more than 1,000 operating hours.

Conventional anode electrodes were tested under similar conditions and their polarization and performance were compared to those of anode electrodes prepared with the ceramic additives. Anode polarizations estimated for the anode electrodes tested, as well as cathode polarizations of the cathodes used in the button cells that were tested, are summarized in Table 1 below.

TABLE 1

| Cell number | Anode Composition | Cathode Composition | Anode polarization at 160 mA/cm² | Cathode polarization at 160 mA/cm² |
|---|---|---|---|---|
| 3-44 (400 h) | Ni—3Al (conventional) | NiO | 45 mV | 48 mV |
| 3-85 (770 h) | Ni—3Al + 4.3 wt % CeO₂ additive | NiO | 29 mV | 46 mV |
| 3-103 (1000 h) | Ni—3Al + 3.3 wt % LSC | NiO | 29 mV | 43 mV |

As can be seen from the results of the test results summarized in Table 1, the addition of $CeO_2$ or LSC to the anode as ceramic additive materials resulted in a decreased polarization of the anode electrode by about 35%. The reduction in the anode polarization improves the performance of the fuel cell because of the improved active surface area and better wettability of the anode electrode. In addition, the addition of ceramic additive materials in the anode electrode may also improve the anode's catalytic properties, resulting in further improvements to the fuel cell performance.

The anodes formed with the ceramic additive materials in accord with the above example were also tested to determine stability of fuel cells employing such anodes and to compare with the stability of fuel cells employing conventional anodes. The anodes with ceramic additive materials and conventional anodes were tested in button cells having a surface area of 3 cm³. The tests were performed at a temperature of 650° C., current density of 160 mA/cm² and at low utilization of about 5%. The stability of the button fuel cells was determined by measuring and recording the resistance in mohm-cm² of the cells over the operating time of the cells. When the measured resistance of the cells was more stable during the operating time, i.e., the measured resistance remained relatively constant with small variations over time, the stability of the cells was also more stable. In contrast, significant variations in the measured resistance of the cell over time, and in particular, significant increases in the resistance of the cell as operating time passed, indicated a lower stability of the fuel cell.

Figure 5:
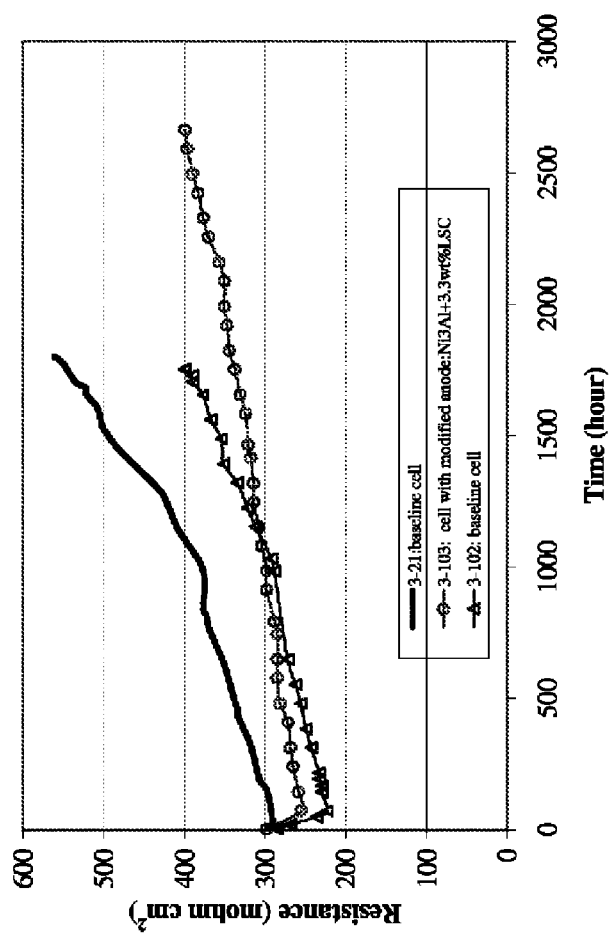
FIG. 5 shows a resistance lifegraph for fuel cell employing conventional anodes and for fuel cells employing the improved anode of FIG. 1.

FIG. 5 shows a resistance lifegraph for button cells employing conventional anodes and for button cells employing the anodes with the ceramic additive materials, namely, the anodes prepared from Ni-3Al and 3.3 wt % LSC. In FIG. 5, the X-axis represents the operating time of the fuel cell in hours, while the Y-axis represents the resistance of the fuel cell being tested in mohm-cm². As can be seen in FIG. 5, the fuel cells with conventional anodes, or baseline cells, had a significantly greater increase in resistance over time than the fuel cells with the Ni-3Al+3.3 wt % LSC anodes. In particular, the resistance of the fuel cells with conventional anodes increased at an average rate of about 106 mohm-cm² over 1000 hours of operating time. In particular, in one test of the cells with conventional anodes, the resistance increased from about 300 mohm-cm² to about 550 mohm-cm² over about 1750 hours of operating time, while in another test of the cells with conventional anodes, the resistance increased from about 220 mohm-cm² to about 400 mohm-cm² over 1750 hours. In contrast, the resistance of fuel cells using LSC-doped anodes formed from Ni-3Al and 3.3 wt % LSC increased from about 270 mohm-cm² to about 400 mohm-cm² over an operating time of about 2,600 hours, at an average rate of about 49 mohm-cm² over 1000 hours of operating time. Accordingly, the tests showed that the use of the doped anodes formed from Ni-3Al and 3.3 wt % LSC substantially increased the stability of the fuel cells in which they were used.

The improvement in the stability of the fuel cells with LSC-doped anodes as compared to the stability of fuel cells with conventional anodes, is attributed mainly due to an increased stability of the interface between the anode and the electrolyte matrix of the fuel cell, which results from the increased electrolyte retention of LSC-doped anodes. In particular, the improved pore structure and the increased number of small pores in the LSC-doped anodes allows more electrolyte to be stored in, and retained by, the anodes, which stabilizes the interface between the anode and the matrix and delays the increase in the resistance of the fuel cell.

The improvements in the pore structure, electrolyte retention and stability were also observed in anodes that were formed with other ceramic additive materials, such as $CeO_2$, yttrium doped ceria (YDC), yttrium doped zirconia (YSZ), $TiO_2$, $LiAlO_2$ and $Li_2TiO_3$. As a result of these improvements to the anode, the fuel cell performance is improved and the operating life of the fuel cell is increased. In addition, the preparation of such anodes doped with ceramic additive materials as described above results in further efficiencies due to the smaller number of steps involved, and the simplicity of the anode electrode manufacturing process.

In all cases it is understood that the above-described arrangements are merely illustrative of the many possible specific embodiments which represent applications of the present invention. Numerous and varied other arrangements, including use of different materials, such as other ceramic additive materials and various configurations of components of the fuel cell, can be readily devised without departing from the spirit and scope of the invention.

What is claimed is:

1. A molten carbonate fuel cell anode comprising a porous anode body, said anode body comprising a nickel-based alloy and at least one ceramic additive, different from the nickel-based alloy, substantially uniformly dispersed throughout the anode body, wherein an amount of said at least one ceramic additive in said anode body being greater than 5% and up to 50% by volume and wherein said ceramic additive is selected from the group consisting of $CeO_2$, yttrium doped ceria, yttrium doped zirconium, $TiO_2$, $Li_2TiO_3$, $LiAlO_2$ and $La_{0.8}Sr_{0.2}CoO_3$, wherein a process of making said anode body comprises forming a slurry which comprises a nickel-based alloy mixed with at least one ceramic additive.

2. A molten carbonate fuel cell anode in accordance with claim 1, wherein the amount of said at least one ceramic additive in said anode body is greater than 5% and not more than 30% by volume.

3. A molten carbonate fuel cell in accordance with claim 1, wherein said nickel-based alloy is selected from the group consisting of Ni—Cr alloy having 1-30% of Cr by weight and Ni—Al alloy having 1-30% of Al by weight.

4. A molten carbonate fuel cell anode in accordance with claim 1, wherein said ceramic additive comprises ceramic material which has same or better stability than $LiAlO_2$ during fuel cell operation.

5. A molten carbonate fuel cell anode in accordance with claim 4, wherein said anode body is formed from Ni-alloy powder and ceramic additive powder, said ceramic additive powder having a mean particle size of less than 5 microns.

6. A molten carbonate fuel cell anode in accordance with claim 5, wherein said Ni-alloy powder has a mean particle size between 10 and 60 microns.

7. A molten carbonate fuel cell anode in accordance with claim 6, wherein said Ni-alloy powder has a mean particle size of about 20 microns.

8. A method of making a molten carbonate fuel cell anode comprising:
providing a nickel-based alloy;
providing at least one ceramic additive; and
forming said anode body from said nickel-based alloy and said at least one ceramic additive so that said ceramic additive is uniformly dispersed throughout said anode body,
wherein said forming comprises mixing the nickel-based alloy, to form a slurry and forming said anode body from the slurry,
wherein an amount of said at least one ceramic additive in said anode body is greater than 5% and up to 50% by volume, and
wherein said ceramic additive is selected from the group consisting of $CeO_2$, yttrium doped ceria, yttrium doped zirconium, $TiO_2$, $Li_2TiO_3$, $LiAlO_2$ and $La_{0.8}Sr_{0.2}CoO_3$.

9. A method of making a molten carbonate fuel cell anode in accordance with claim 8, wherein the amount of said at least one ceramic additive in said anode body is greater than 5% and not more than 30% by volume.

10. A method of making a molten carbonate fuel cell anode in accordance with claim 8, wherein said nickel-based alloy is one of Ni—Cr alloy having 1-30% of Cr by weight and Ni—Al alloy having 1-30% of Al by weight.

11. A method of making a molten carbonate fuel cell anode in accordance with claim 8, wherein said ceramic additive comprises ceramic material which has same or better stability than $LiAlO_2$ during fuel cell operation.

12. A method of making a molten carbonate fuel cell anode in accordance with claim 11, wherein said Ni-alloy is in powder form and wherein said at least one ceramic additive is in powder form having a mean particle size of less than 5 microns.

13. A method of making a molten carbonate fuel cell anode in accordance with claim 12, wherein said Ni-alloy powder has a mean particle size of about 20 microns.

14. A method of making a molten carbonate fuel cell anode in accordance with claim 13, further comprising preparing a binder solution and mixing said Ni-alloy powder and said ceramic additive powder with said binder solution to form an anode slurry, and wherein said anode body is formed from said anode slurry.

15. A method of making a molten carbonate fuel cell anode in accordance with claim 14, wherein said binder solution comprises at least one of a binder, a dispersant, a solvent and a plasticizer.

16. A method of making a molten carbonate fuel cell anode in accordance with claim 15, wherein said binder is an acryloid binder, said dispersant is fish oil, said solvent is reagent alcohol and said plasticizer is santicizer plasticizer.

17. A method of making a molten carbonate fuel cell anode in accordance with claim 15, wherein said mixing said Ni-alloy powder and said ceramic additive powder with said binder solution is performed using a ball milling process.

18. A method of making a molten carbonate fuel cell anode in accordance with claim 14, wherein said forming said anode body comprises tape casting said anode slurry at a predetermined thickness.

19. A method of making a molten carbonate fuel cell anode in accordance with claim 18, wherein said predetermined thickness is 3-15 mils.

20. A method of making a molten carbonate fuel cell anode in accordance with claim 18, wherein said forming said anode body further comprises drying said tapecast slurry at room temperature.

21. A method of making a molten carbonate fuel cell anode in accordance with claim 20, wherein said forming said anode body further comprises laminating said anode on a porous support member after drying said slurry.

22. A molten carbonate fuel cell comprising:
an anode;
a cathode;
an electrolyte situated between said cathode and said anode; and
wherein said anode comprises a porous anode body, said anode body comprising a nickel-based alloy and at least one ceramic additive, different from the nickel-based alloy, substantially uniformly dispersed throughout the anode body, wherein an amount of said at least one ceramic additive in said anode body being greater than 5% and up to 50% by volume, and wherein said ceramic additive is selected from the group consisting of $CeO_2$, yttrium doped ceria, yttrium doped zirconia, $TiO_2$, $Li_2TiO_3$, $LiAlO_2$ and $La_{0.8}Sr_{0.2}CoO_3$, wherein a process of making said anode body comprises forming a slurry which comprises a nickel based alloy mixed with at least one ceramic additive.

23. A molten carbonate fuel cell in accordance with claim 22, wherein the amount of said at least one ceramic additive in said anode body is greater than 5% and not more than 30% by volume.

24. A molten carbonate fuel cell in accordance with claim 22, wherein said nickel-based alloy is one of Ni—Cr alloy having 1-30% of Cr by weight and Ni—Al alloy having 1-30% of Al by weight.

25. A molten carbonate fuel cell in accordance with claim 22, wherein said ceramic material comprises ceramic material which has same or better stability than $LiAlO_2$ during fuel cell operation.

26. A molten carbonate fuel cell in accordance with claim 25, wherein said anode body is formed from Ni-alloy powder and ceramic additive powder, said ceramic additive powder having a mean particle size of less than 5microns.

27. A molten carbonate fuel cell in accordance with claim 26, wherein said Ni-alloy powder has a mean particle size between 10 and 60 microns.

28. A molten carbonate fuel cell in accordance with claim 27, wherein said Ni-alloy powder has a mean particle size of about 20 microns.

* * * * *